(No Model.)
A. CAMPBELL.
FLEXIBLE JOINT.
No. 545,268. Patented Aug. 27, 1895.
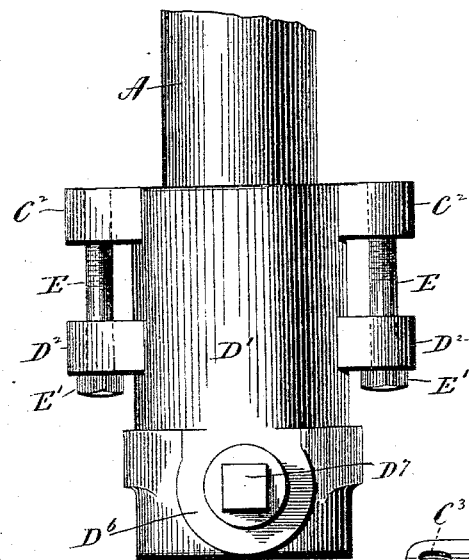
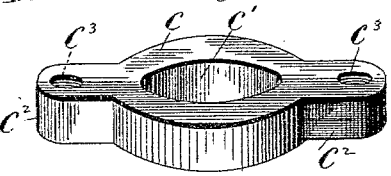
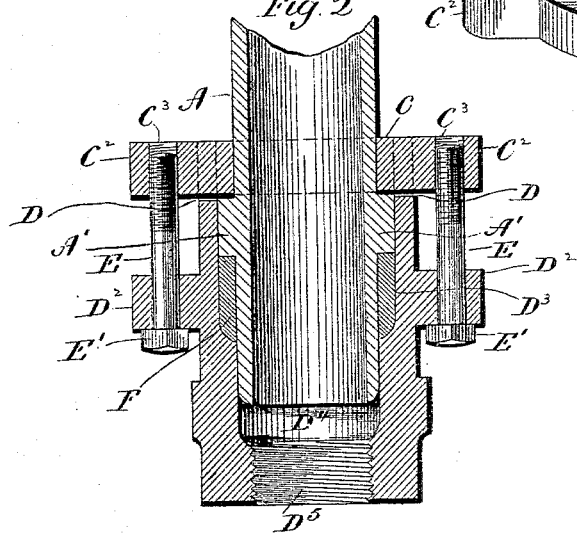
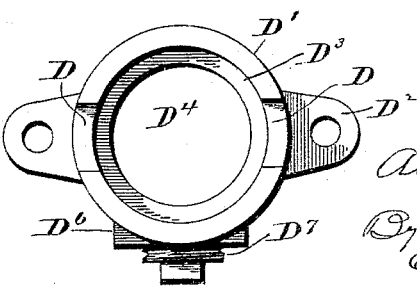
Witnesses:
J. H. Shumway
A. S. Hotchkiss
Albert Campbell, Inventor
By Attys
Earle Seymour

UNITED STATES PATENT OFFICE.

ALBERT CAMPBELL, OF NOROTON, CONNECTICUT.

FLEXIBLE JOINT.

SPECIFICATION forming part of Letters Patent No. 545,268, dated August 27, 1895.

Application filed March 14, 1895. Serial No. 541,790. (No model.)

*To all whom it may concern:*

Be it known that I, ALBERT CAMPBELL, of Noroton Heights, in the county of Fairfield and State of Connecticut, have invented a new Improvement in Flexible Joints; and I do hereby declare the following, when taken in connection with the accompanying drawings and the letters of reference marked thereon, to be a full, clear, and exact description of the same, and which said drawings constitute part of this specification, and represent, in—

Figure 1, a view in side elevation of a flexible joint constructed in accordance with my invention; Fig. 2, a view thereof in vertical longitudinal section; Fig. 3, a plan view of the body or casing of the device with the rotatable pipe section and yoke removed; Fig. 4, a detached perspective view of the yoke.

My invention relates to an improvement in flexible joints for steam, water, compressed-air, or other pipes, the object being to provide at a comparatively low cost for manufacture an effective, convenient, and durable joint, composed of few parts, easily understood, and not liable to get out of order.

With these ends in view my invention consists in a flexible joint having certain details of construction and combinations of parts, as will be hereinafter described, and pointed out in the claim.

In carrying out my invention I provide the pipe-section A, which issues from the joint, and which is rotatable therein, with a circumferential and preferably integral band or shoulder A', by means of which the said pipe-section is held in place through the medium of a yoke C, having a central opening C', corresponding in internal diameter to the external diameter of the pipe, and having, also, two oppositely-projecting corresponding lugs $C^2$ $C^2$, which set down into slots D D, formed in the joint casing or body D', as clearly shown in Fig. 3, the said lugs being constructed with internally-threaded openings $C^3$ $C^3$, receiving-bolts E E, also passing through perforated lugs $D^2$ $D^2$, formed integral with the body or casing D' aforesaid. The inner ends of the bolts are provided with heads E', by means of which they are turned, as desired, to increase or decrease the draft of the bolts upon the yoke, and therefore to increase or decrease the pressure of the yoke upon the circumferential shoulder A' of the pipe-section A. The inner edge of the said shoulder or band rests upon an annular packing-ring F, located within the casing or body D', which is constructed for the purpose, with an interior chamber $D^8$, corresponding in internal diameter to the external diameter of the band or shoulder A' and the annular packing-ring F, the inner edge of which rests upon the bottom of the chamber, which forms an offset, as it were, from the central passage $D^4$ of the body or casing. It will be readily understood that the pipe-section A' may be rotated within the casing or body, in which it is held by the shoulder or band A', and in which it is packed by the co-operation of the packing-ring with the said shoulder or band. The said body or casing is also constructed in line with the longitudinal opening $D^4$ with a threaded opening $D^5$, designed to receive one end of the supply-pipe, whether that pipe be applied for supplying steam, water, compressed air, or what not. The body or casing is also furnished, as shown in Fig. 1, with a lateral projection $D^6$, containing a plug $D^7$. If it is desired to make a connection with the joint at a right angle therewith, the plug $D^7$ is removed and the supply-pipe introduced into the projection $D^6$, in which case the plug is transposed and inserted into the opening $D^5$; but when the supply-pipe is entered into the opening $D^5$ the plug $D^7$ is used to stop up the opening in the projection $D^6$.

I would have it understood that I do not limit myself to the exact construction herein shown and described, but hold myself at liberty to make such changes and alterations as fairly fall within the spirit and scope of my invention.

Having fully described my invention, what I claim as new, and desire to secure by Letters Patent, is—

In a flexible joint, the combination with a body or casing, having its outer end constructed with two slots located opposite each other, of an annular packing-ring located within the said casing, a rotatable pipe-section located within the casing, and provided with a circumferential band or shoulder adapted to bear at one edge upon one edge of the said annular packing-ring, a yoke having a central opening for the said pipe-section to pass through, adapted to bear upon the outer edge of the band or shoulder thereof, and provided with oppositely projecting lugs, having internally threaded openings, and screw-bolts entering the threaded openings of the said lugs, and connected with the body or casing, which is slotted to receive the same, substantially as set forth.

In testimony whereof I have signed this specification in the presence of two subscribing witnesses.

ALBERT CAMPBELL.

Witnesses:
FRED C. EARLE,
A. S. HOTCHKISS.